Oct. 27, 1925.
B. F. SCHMIDT
CAMERA
Filed Sept. 26, 1921
1,559,285
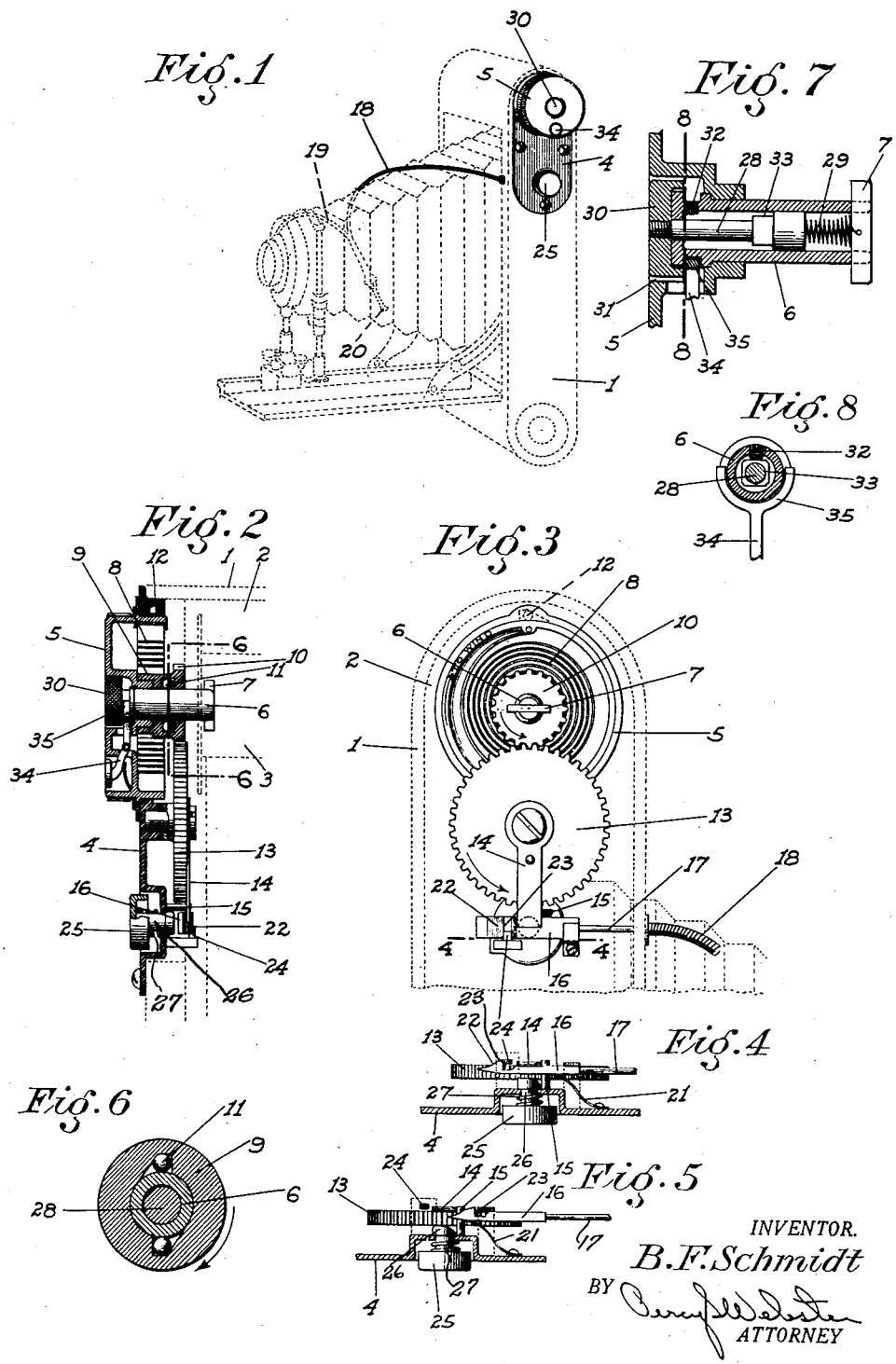
INVENTOR.
B. F. Schmidt
BY
ATTORNEY Patented Oct. 27, 1925.

1,559,285

UNITED STATES PATENT OFFICE.

BENJAMIN F. SCHMIDT, OF LOS ANGELES, CALIFORNIA.

CAMERA.

Application filed September 26, 1921. Serial No. 503,178.

*To all whom it may concern:*

Be it known that I, BENJAMIN F. SCHMIDT, a citizen of the United States, residing at Los Angeles, in the county of Los Angeles, State of California, have invented certain new and useful Improvements in Cameras; and I do declare the following to be a full, clear, and exact description of the same, reference being had to the accompanying drawings, and to the characters of reference marked thereon, which form a part of this application.

This invention relates to improvements in cameras, and particularly to that type of hand-camera generally used by amateur photographers, which is designed to use film-rolls therein and in which the shutter is actuated by a spring-pressed flexible cable or wire.

When taking pictures with this type of camera, the operator frequently forgets to turn the film-spool after exposing a section of the film, and as in the cameras now on the market there is nothing to prevent the shutter being again actuated, a double exposure is the result, both photographs being of course ruined, which apart from the monetary value of the film sometimes represents a loss to the photographer of a different and greater nature.

The principal object of my invention is to provide a camera with means for positively preventing a double exposure of the film, or in other words making it impossible to actuate the shutter again until the exposed film section has been wound onto the spool and a new section has been wound into position for exposure.

Another object is to provide a manually operated means for both releasing or restoring the shutter actuating member to its normal position, and for causing the exposed section of film to be wound onto the spool, and the next section to be positioned in the proper plane for exposure prior to the release of the shutter member.

This does away with the use of the usual hand-winding apparatus once the first film section is moved to operative position, practically making it impossible for a film-section to be wound onto the spool until it has been exposed.

A handwinding means however is provided to wind the film onto the take-up spool from its outer end to the first sensitized section, but as soon as the finger button or handle is released by the operator, it automatically moves to lie flush with the camera-case, and even though it should be rotated while in that position, no turning of the spool will be effected.

This button then being out of the way, accidental winding of the film is thus made impossible since the button must be intentionally moved to an operative position before the spool can be rotated thereby.

The tendency to utilize this hand winding means when unnecessary is also lessened by the fact that the release member controlling the release of the shutter control and the winding of the film is much easier and more convenient to use than the other, and would therefore be used by any normally intelligent person.

Another object is to provide a structure for the purpose which is relatively simple and not likely to get out of order, and which may be readily incorporated or attached in any modern camera of the type mentioned, without necessitating any structural alterations being made therein.

These objects I accomplish by means of such structure and relative arrangement of parts as will fully appear by a perusal of the following specification and claims.

In the drawings similar characters of reference indicate corresponding parts in the several views.

Fig. 1 is a perspective outline of a folding hand-camera, showing a branched cable actuating means for the shutter and shutter-control lock, and the other visible parts, including the manually operated buttons.

Fig. 2 is an enlarged transverse section through one end of the camera, showing particularly the hand and automatic spool winding means.

Fig. 3 is an inner-end view of this structure.

Fig. 4 is a fragmentary cross section taken on a line 4—4 of Fig. 3, showing the shutter control lock member positioned after the shutter has been actuated, and the release button therefor.

Fig. 5 is a similar view, showing the position of the shutter control-lock after its release, or when the shutter control member is again in position to be pressed to actuate the shutter.

Fig. 6 is a cross section taken on a line 6—6 of Fig. 2, showing an overrunning or one-way grip form of clutch.

Fig. 7 is an enlarged detached sectional view of the film-spool hand-winding mechanism.

Fig. 8 is a cross section of the same taken on a line 8—8 of Fig. 7.

Referring now more particularly to the characters of reference on the drawings, the numeral 1 denotes the casing of the camera having the usual chamber 2 at one end adapted to receive a take-up spool 3 of the usual character. On the outside of the casing adjacent said chamber is fixed a bearing plate 4 turnably mounted on which axially of the spool 3 and projecting outwardly from the plate is a cylindrical cup 5 centrally in which is turnably mounted a pin 6 on the inner end of which is a crossbar 7 adapted to engage the usual slotted recess provided in the spool.

Positioned in the cup and fixed thereon at its outer end is a spiral spring 8 of the usual clock work type, the inner end of which is fixed to the hub 9 of a pinion 10 mounted on the pin or shaft 6. The hub is free on the shaft, but the latter is caused to rotate therewith only in the direction of the unwinding of the spring by means of a form of one way grip or overrunning clutch or friction means incorporated in the hub 9, as shown at 11. A similar but oppositely disposed friction engaging means 12 is interposed between the plate 4 and cup 5, so that while the latter may be turned at any time to wind up the spring, said spring cannot impart rotation to the cup in the opposite direction.

Pawl and ratchet mechanisms would serve the same purpose, but I believe the means shown to be simpler, less expensive, and noiseless in operation.

Journaled in the plate 4 beyond the cup is a gear 13 meshing with the pinion 10. This gear has a spring bar 14 fixed thereon projecting beyond the teeth thereof and normally bearing against a stop pin 15 projecting from the plate 4 into the path of movement of said bar.

Positioned between the bar and plate and projecting partly under said bar and partly outwardly thereof is a lock-finger 16 to which is connected a cable or wire 17 which extends through a flexible casing or sleeve 18 to a connection with the similar sleeve 19 containing the shutter actuating cable, both cables being moved in common by a push-button 20. The finger is normally held against the bar 14 by a spring 21 weaker than the spring bar, and at the end thereof opposite the wire 17 has a cam surface 22 on its upper face and a shoulder 23 at the inner end of said cam surface, this shoulder bearing against a stop pin 24 mounted on the plate 4 out of the path of movement of the bar 14.

Mounted in the plate 4 and positioned outside the same is a push-button 25 having a stem 26 projecting through the plate to bear against the finger 16. A spring 27 about the stem acts to normally hold the button outwardly and the stem away from the finger.

In operation, the spring 8 tends to cause the pinion 10 to turn in one direction, and the gear 13 in the opposite direction, or with the bar 14 against the stop 15. Neither gear can then normally rotate, since they are in mesh with each other, and neither can turn without the other.

If the button 25 is depressed when the finger 16 is held by the stop 24, which will be when the shutter has been actuated and the actuating member 20 of the shutter control wire is pushed in, the finger will then be between the bar 14 and the stem 26, and the latter will press the finger against the bar, raising the same clear of the stop 15, and permitting the gear, and consequently the pinion, to rotate, the relative proportions of the gear and pinion being such that a single revolution of the gear allows a sufficient number of turns of the pinion to rotate the spool 3 to wind the film thereon from one exposed section to the next unexposed section.

The gear however can only have one revolution at a time, since with the rotation thereof past the pin 15 and around, the bar ultimately comes in contact with the cam surface of the finger, depressing the same clear of the stop 24, thus allowing the finger to return to a position away from under the bar, as shown in Fig. 5, in which position the shutter control cable (which as usual is spring pulled) is likewise released and restored to its normal position. The bar 14 will then resume its normal position and will again abut against and be held by the pin 15, where it will remain until again raised by the depression of the button 25. Any such depression of the latter however, as long as the finger is not between the bar and stem, will not raise the bar, since the movement allowed the stem is not sufficient for the latter to reach and raise the bar unless the finger is therebetween. Thus as long as the finger and shutter control member are in their released position, there can be no automatic winding of the film. Also when the finger moves to engage the stop 24 with the actuation of the shutter control, it cannot be released except after the rotation of the gear which controls the winding of the exposed film.

An auxiliary hand-winding structure, normally positioned so that it cannot be accidentally used, is provided. This consists of a stem 28, slidable and normally turnable in the member 6. This stem is normally drawn inwardly of said member 6 by a spring 29, and carries on its outer end a turning button or handle 30 which is normally countersunk in a recess 31 provided in the cup 5 The portion of the stem adjacent said handle is smaller than the bore of the member 6, which has a pin 32 projecting thereinto.

The stem has at a certain point a rectangular or other flat surfaced portion 33, any one of the sides of which is adapted to move across the inner end of the pin 32 when the handle and stem are drawn outwardly. When such an operation takes place, if the button is then rotated, the flat portion 33 of the stem will be engaged by the pin and the stem will thus be unable to rotate freely of itself, but must also rotate the member 6, and consequently the spool 3 therewith As soon as the fingers are withdrawn from the button however, the latter is drawn to its socketed or countersunk position by the spring 29, and the flat portion of the stem is moved out of engagement with the screw, said engagement being only had when the stem is pulled out to its fullest extent With the button not so countersunk, or even if only partly drawn out, no rotation will be imparted to the member 6 with the rotation of the member 28.

In order to draw said member outwardly a sufficient distance to disengage the bar 7 from the spool when necessary, a small finger-pressed lever 34 is mounted in the cup and is provided with a fork or yoke 35 engaging the member 6 adjacent its outer end, this lever being allowed only sufficient depression as will move the cross bar of the member 6 clear of the spool.

It will be noted that rotative movement of the shaft 6 in one direction only, and independently of the pinion thereon, may be had by reason of the cooperating clutch or friction structure 11

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. In a film-roll camera having a shutter actuating means, a member movable with said means, locking means for holding said member from return movement when the shutter actuating means is operated, automatic means for rotating the film spool, hand means for controlling the operation of the automatic means, and means whereby only after the rotation of the spool a sufficient number of revolutions to completely wind the exposed film thereon will the member be released.

2. In a film-roll camera having a shutter actuating means, a member movable therewith, locking means for holding said member from return movement when the shutter actuating means is operated, automatic means for rotating the film spool, hand means for controlling the operation of the automatic means, and means controlled by the operation of the automatic means for releasing the member only after the spool has been rotated the number of times necessary to completely wind the exposed film thereon.

3. In a film-roll camera having a shutter actuating means, a cable movable therewith, locking means for holding said cable from return movement when the shutter actuating means is operated, automatic means for rotating the film spool, hand means for controlling the operation of the automatic means, and means whereby said automatic means will not be placed in operation by said hand means unless the shutter has been actuated and the cable is locked.

4. In a film-roll camera having a shutter actuateing means, automatic means for rotating the film spool to wind the film thereon, hand means for controlling the operation of the automatic means, and means controlled by the movement of the shutter-actuating means whereby the hand means is prevented from setting the automatic means in operation until the shutter has been actuated.

5. In a film-roll camera having a shutter actuating means, automatic means for rotating the film spool to wind the film thereon, hand means for controlling the operation of the automatic means, means whereby the hand means is prevented from setting the automatic means in operation until the shutter has been actuated and means whereby when the shutter actuating means is coactuated it cannot resume its normal position until the automatic winding means has been operated.

6. In a film-roll camera having a shutter actuating means, automatic means for rotating the film spool to wind the film thereon, hand means for controlling the operation of the automatic means, means whereby the hand means is prevented from setting the automatic means in operation until the shutter has been actuated, means for then preventing the shutter actuating means from returning to its normal position, and means controlled by the operation of the automatic means for releasing said actuating means after the spool has been rotated a predetermined number of times.

7. In a film roll-camera having a shutter actuating means, a shaft adapted to engage the film spool to turn therewith, spring means for rotating said shaft in one direction only, a pinion on the latter, a gear meshing with the pinion, means normally holding said gear against rotation, and means whereby said gear may be released to turn only when the shutter has been actuated.

8. In a film roll-camera having a shutter actuating means, a shaft adapted to engage the film spool to turn therewith, spring means for rotating said shaft in one direction only, a pinion on the latter, a gear meshing with the pinion, means normally holding said gear against rotation, and means operatively connected with the shutter actuating means whereby said gear may only be released after said actuating means has been actuated.

9. In a film roll-camera having a shutter actuating means, a shaft adapted to engage the film spool to turn therewith, spring means for rotating said shaft in one direction only, a pinion on the latter, a gear meshing with the pinion, means normally holding said gear against rotation, a cable connected to the shutter actuating means and movable therewith, a finger on the end of said cable adapted to move alongside the edge of the gear when the shutter is actuated and to be then locked in that position, a push button on the exterior of the camera case, and means whereby with the depression of said button only when the finger is in locked position the gear will first be released and the finger subsequently unlocked and allowed to return to its normal position.

10. In a film roll-camera having a shutter actuating means, a shaft adapted to engage the film spool to turn therewith, spring means for rotating said shaft in one direction only, a pinion on the latter, a gear meshing with the pinion, a flat spring on the gear projecting beyond the edge thereof, a stop pin positioned to normally engage said spring to hold the gear against rotation, a cable connected to the shutter actuating means and movable therewith, a finger on the end of said cable adapted to project between the flat spring and the camera case when the shutter is actuated and to be then locked in that position, a manually-pressed stem adapted to bear against the finger to force the same against the flat spring and raise the same clear of the stop pin, and means whereby after the rotation of said gear to a point again adjacent the stop pin the finger will be released.

11. In a film roll-camera having a shutter actuating means, a shaft adapted to engage the film spool to turn therewith, spring means for rotating said shaft in one direction only, a pinion on the latter, a gear meshing with the pinion, a flat spring on the gear projecting beyond the edge thereof, a stop pin positioned to normally engage said spring to hold the gear against rotation, a cable connected to the shutter actuating means and movable therewith, a finger on the end of said cable adapted to project between the flat spring and the camera case when the shutter is actuated and to be then locked in that position, a manually-pressed stem adapted to bear against the finger to force the same against the flat spring and raise the same clear of the stop pin, another stop pin normally holding the finger against return movement, and a cam surface on said finger adapted to be engaged by the flat spring after a predetermined extent of rotation of the gear to depress said finger clear of its stop-pin.

12. In a film-roll camera having a shutter actuating means, a cable movable therewith, locking means for holding the cable from return movement when the shutter actuating means is actuated and until a new film-section has been placed in position for exposure, automatic means for rotating the film-spool, and hand means for controlling the operation of the automatic means effective only after the shutter has been operated.

13. In a film-roll camera having a shutter actuating means, automatic means for rotating the film-spool to wind the film thereon, and hand means dependent upon the prior movement of the shutter control means for controlling the operation of the automatic means only after the shutter control means has been operated.

14. In a film-roll camera having a shutter actuating means, automatic means for rotating the film-spool to wind the film thereon, operable only after the shutter has been operated, hand means for controlling the operation of the automatic means through co-operation with the shutter control means, means whereby the hand means is prevented from setting the automatic means in operation until the shutter control means has been actuated, and means whereby when the shutter control means is so actuated it cannot resume its normal position until the automatic winding means has been operated.

15. In a film-roll camera having a shutter actuating means, automatic means for rotating the film-spool to wind the film thereon, operable only after the shutter has been operated, means for then preventing the shutter actuating means from returning to its normal position until the exposed film section is completely wound on its spool, hand means for controlling the operation of the automatic means only with the co-operation of the shutter control means, means whereby the hand means is prevented from setting the automatic means in operation until the shutter has been actuated, and means controlled by the operation of the automatic means for releasing said actuating means only after the spool has been rotated the necessary number of times.

16. In a film-roll camera having a shutter actuating means by a spring-pulled cable, a shaft adapted to engage the film-spool to turn therewith, spring means for rotating said shaft in one direction only and operative only after the shutter has been actuated, means then holding said actuating means inoperative and against return to normal, a pinion on the shaft, a gear meshing with the pinion, means normally holding said gear against rotation, and means whereby said gear may be released to turn only when the shutter control means has been actuated and retained in said inoperative position.

17. In a film roll camera having a shutter and operating means therefor, automatic means for winding the film onto its spool operable only after the shutter has been actuated and then operating only to the extent of winding the exposed film thereon, hand means controlling the operation of said automatic means, and means preventing the functioning of the hand means more than once between any two consecutive actuations of the shutter.

18. In a film roll camera having a shutter and a depressible actuating member therefor, automatic means for winding the film, hand means controlling the operation of the automatic means, means whereby the shutter actuating member will be locked and held against return to a normal position after being depressed until the exposed portion of the film has been wound onto its spool, and means whereby the hand means cannot function after being once actuated until the shutter is again actuated.

In testimony whereof I affix my signature.

BENJAMIN F. SCHMIDT.